(12) United States Patent
Steely

(10) Patent No.: US 7,685,736 B2
(45) Date of Patent: Mar. 30, 2010

(54) SHOULDER REFACING INDICATOR

(75) Inventor: Clay Y. Steely, Kingwood, TX (US)

(73) Assignee: Grant Prideco, L.P., Houston, TX (US)

( * ) Notice: Subject to any disclaimer, the term of this patent is extended or adjusted under 35 U.S.C. 154(b) by 844 days.

(21) Appl. No.: 11/461,577

(22) Filed: Aug. 1, 2006

(65) Prior Publication Data

US 2008/0042431 A1 Feb. 21, 2008

(51) Int. Cl.
*G01B 3/56* (2006.01)

(52) U.S. Cl. .............. 33/833; 33/492; 33/529; 33/534; 285/93; 116/208; 138/36

(58) Field of Classification Search ............ 3/1 BB, 3/21.3, 199 R, 282, 483, 492, 529, 534, 679.1, 3/832, 833, 836; 285/39, 93; 7/157; 116/208; 138/36

See application file for complete search history.

(56) References Cited

U.S. PATENT DOCUMENTS

| | | | | |
|---|---|---|---|---|
| 320,976 A * | 6/1885 | Shedlock | ............ | 33/199 R |
| 494,169 A * | 3/1893 | Schaum | ............ | 33/201 |
| 1,660,239 A * | 2/1928 | Stanforth | ............ | 33/1 R |
| 2,112,930 A * | 4/1938 | Shulman et al. | ............ | 33/2 R |
| 2,924,015 A * | 2/1960 | Gurries | ............ | 33/486 |
| 3,154,861 A * | 11/1964 | Rubenstein | ............ | 33/662 |
| 3,252,223 A * | 5/1966 | Gettel | ............ | 33/534 |
| 4,075,467 A * | 2/1978 | Peterson | ............ | 362/602 |
| 4,342,153 A * | 8/1982 | Cole | ............ | 33/836 |
| 4,438,953 A | 3/1984 | Timme, Jr. | | |
| 4,455,753 A * | 6/1984 | Keyes | ............ | 33/679.1 |
| 4,479,306 A * | 10/1984 | Klementich | ............ | 33/199 R |
| 4,517,745 A * | 5/1985 | Hare | ............ | 33/529 |
| 4,618,465 A * | 10/1986 | Parks | ............ | 264/40.1 |
| 4,745,685 A * | 5/1988 | Castillo | ............ | 33/199 R |
| 4,766,675 A * | 8/1988 | Liu | ............ | 33/529 |
| 5,182,862 A * | 2/1993 | Frank et al. | ............ | 33/199 R |
| 5,280,967 A * | 1/1994 | Varrin, Jr. | ............ | 285/93 |
| 5,450,678 A * | 9/1995 | Check | ............ | 33/833 |
| 5,459,936 A * | 10/1995 | Stange | ............ | 33/563 |
| 6,009,611 A * | 1/2000 | Adams et al. | ............ | 29/407.01 |
| 6,305,093 B1 * | 10/2001 | Venola | ............ | 33/451 |
| 6,725,559 B2 * | 4/2004 | Burt, Jr. | ............ | 33/653 |
| 6,766,584 B1 * | 7/2004 | Reilly | ............ | 33/534 |
| 6,896,300 B2 | 5/2005 | Winship | | |
| 2001/0015555 A1 * | 8/2001 | Mallis | ............ | 285/333 |
| 2007/0214664 A1 * | 9/2007 | Muradov et al. | ............ | 33/199 R |

* cited by examiner

*Primary Examiner*—James M Hewitt
(74) *Attorney, Agent, or Firm*—Williams, Morgan & Amerson, P.C.

(57) ABSTRACT

The present invention is generally directed to shoulder refacing indicator. In one illustrative embodiment, the shoulder refacing indicator includes a body having a first side and a second side, the first and second sides being formed at an included angle of 135 degrees relative to one another, the first side adapted to engage an engaging surface of a make-up shoulder of a pipe connector and the second side adapted to engage a tapered surface of the pipe connector. The shoulder refacing indicator further includes at least one scribe line formed on the body.

6 Claims, 5 Drawing Sheets

SHOULDER REFACING INDICATOR

BACKGROUND OF THE INVENTION

1. Field of the Invention

The present invention is generally directed to the field of tool joints, and, more particularly, to a shoulder refacing indicator, and methods of using same.

2. Description of the Related Art

A string of oil and gas well drill pipe is made up of sections of pipe, each about 30 feet long. Each section has an externally threaded pin on one end and an internally threaded box on the other end. When coupled together, the pin and the box form a tool joint. Each set of threads is tapered and has a point where the pitch diameter is a specific amount, this point being known as the gage point. A make-up shoulder is spaced a selected distance from the gage point of the threads on the pin. Another make-up shoulder is located at the outer end of the box. When fully made-up, these make-up shoulders contact each other under a selected amount of compression to provide a fluid-tight seal. To achieve the proper amount of compression, the distance from the pin make-up shoulder to the gage point of the pin threads, and the distance from the box make-up shoulder to the gage point of the box threads, must be carefully controlled.

During use, the make-up shoulders may gall and score. To achieve a smooth surface again, the shoulders are redressed. It is important that the total material removed from the two mating shoulders may be no more than $1/16$ inch from original, or no more than $1/32$ inch from any shoulder. If the material removal totals more than $1/16$ inch from mating shoulders, inadequate compression may occur during make-up, thus requiring the mating faces to be remachined. Without such corrective measures, fatigue failures and washouts may result.

U.S. Pat. No. 4,438,953 ("the '953 patent") discloses a benchmark consisting of a benchmark shoulder formed around the pin outer diameter $1/8$ inch from the make-up shoulder. The box counterbore had a step formed around it $1/8$ inch from the make-up shoulder. The benchmark shoulder provides a reference line to determine the distance from the make-up shoulder to the reference line, after the make-up shoulder had been redressed. Because the benchmark is a continuous step around the circumference of the pin outer diameter, and a continuous counterbore around the circumference of the box inner diameter, it also serves as an indicator of uneven machining of the tool joint shoulder. The benchmark in the '953 patent is placed on the tool joint during the operation in which threads are machined onto the tool joint.

The benchmark shown and described in the '953 patent has proven to be successful, but suffers from a drawback in that, when the joint has been made up, the benchmark can neither be seen nor measured. In order to determine if the maximum amount of facing has been performed on the mating shoulder surfaces, the joint must be uncoupled, and a measurement made to make this determination. Also, certain prior art benchmarks require the removal of a thread protector, and a certain amount of cleaning of the connection itself prior to making a determination as to whether or not the faces must be machined.

U.S. Pat. No. 6,896,300 ("the '300 patent"), which is assigned to the assignee of the present application, describes a tool joint in which a refacing benchmark is formed on the external bevel on the tool joint connection. The refacing benchmark shows the position of the original shoulder so an inspector can estimate the amount of refacing a connection has undergone and determine if excessive refacing has occurred. Although the invention described in the '300 patent provides significant improvement relative to the prior art, a need still exists for a device that allows for a very quick and very accurate determination as to whether or not a tool joint may be refaced.

The present invention is directed to devices and methods that may solve, or at least reduce, some or all of the aforementioned problems.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is generally directed to a shoulder refacing indicator, and methods of using same. In one illustrative embodiment, the shoulder refacing indicator includes a body having a first side and a second side, the first and second sides being formed at an included angle of 135 degrees relative to one another, the first side adapted to engage an engaging surface of a make-up shoulder of a pipe connector and the second side adapted to engage a tapered surface of the pipe connector. The shoulder refacing indicator further includes at least one scribe line formed on the body.

BRIEF DESCRIPTION OF THE DRAWINGS

The invention may be understood by reference to the following description taken in conjunction with the accompanying drawings, in which like reference numerals identify like elements, and in which.

Figure 1:
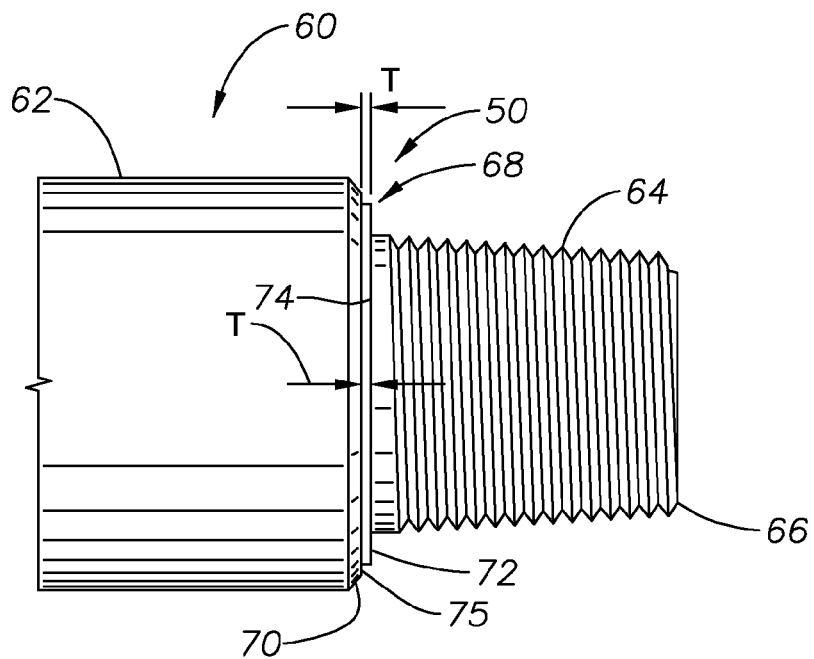
FIG. 1 is a side view of a prior art tool joint pin.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached drawings which are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
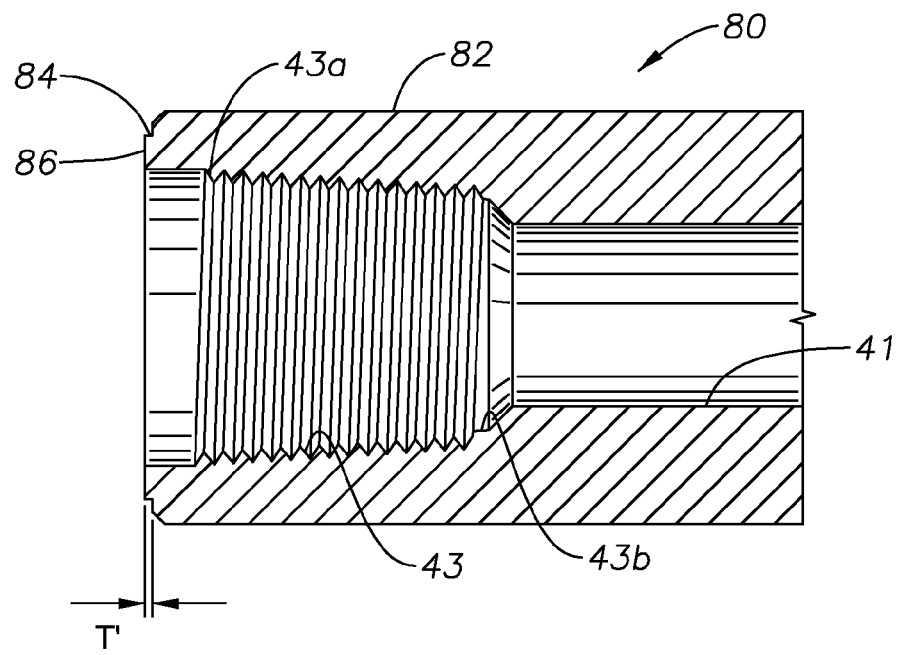
FIG. 2 is a side view of a prior art tool joint box.

FIGS. 1 and 2 are provided to show a prior art tool joint bench mark, in order to gain a clearer understanding of the indicator of the present invention. FIGS. 1 and 2 are, respectively, FIGS. 3 and 4 from the '300 patent (U.S. Pat. No. 6,896,300), which is hereby incorporated by reference in its entirety. As shown in FIG. 1, a prior art tool joint pin 60 defines a cylindrical surface 62 which has an internal bore (not shown). Frusto-conical or tapered threads 64 extend from the surface 62 of the pin 60, terminating in an outer end 66. The pin 60 further comprises a bevel shoulder 68 which extends annularly around a surface 70 at the end of the surface 62. Further, an annular engaging surface 72 defines a make-up shoulder 74, when the pin 60 is made up with the box shown and described below in respect of FIG. 2. The make-up shoulder 74 has an initial thickness T. When the pin 60 is refaced, the thickness T of the make-up shoulder 74 is reduced. For example, the thickness T may be reduced up to a maximum of 1/16".

FIG. 2 depicts a prior art tool joint box 80. The tool joint box 80 has a cylindrical outer surface 82. At the extreme outer end of the surface 82, a make-up shoulder 84 of thickness T' is provided. The make-up plate 84 abuts the make-up shoulder 74 when the tool joint is made up, i.e., the engaging surface 72 engages the engaging surface 86. As the box 80 is refaced, the thickness T' of the make-up shoulder 84 is reduced. The tool joint box 80 has an inner bore 41. A set of internal threads 43 are machined into the bore 41. The threads 43 have an outer end 43a that is located a selected distance from a mating surface 86 of the make-up shoulder 84 and an inner end 43b that is located a selected distance further inward. The threads 43 are tapered, or formed in a frusto-conical surface, with the inner end 43b being of a smaller diameter than the outer end 43a.

Figure 3A:
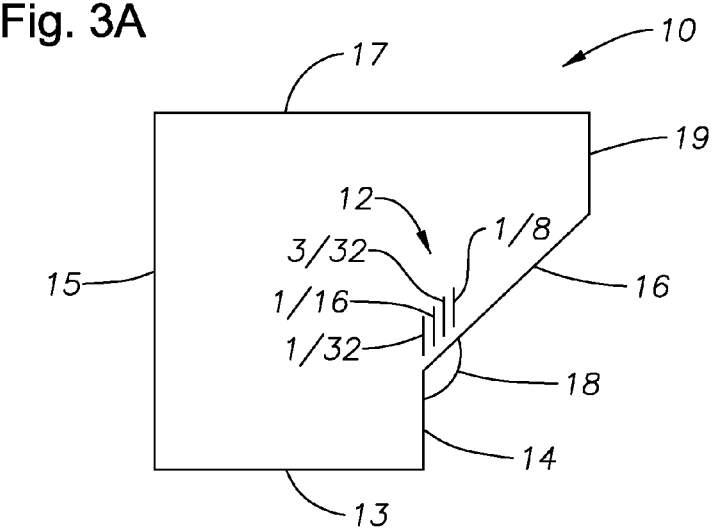
FIGS. 3A-3B depict one illustrative embodiment of the shoulder refacing indicator disclosed herein.
Figure 3B:
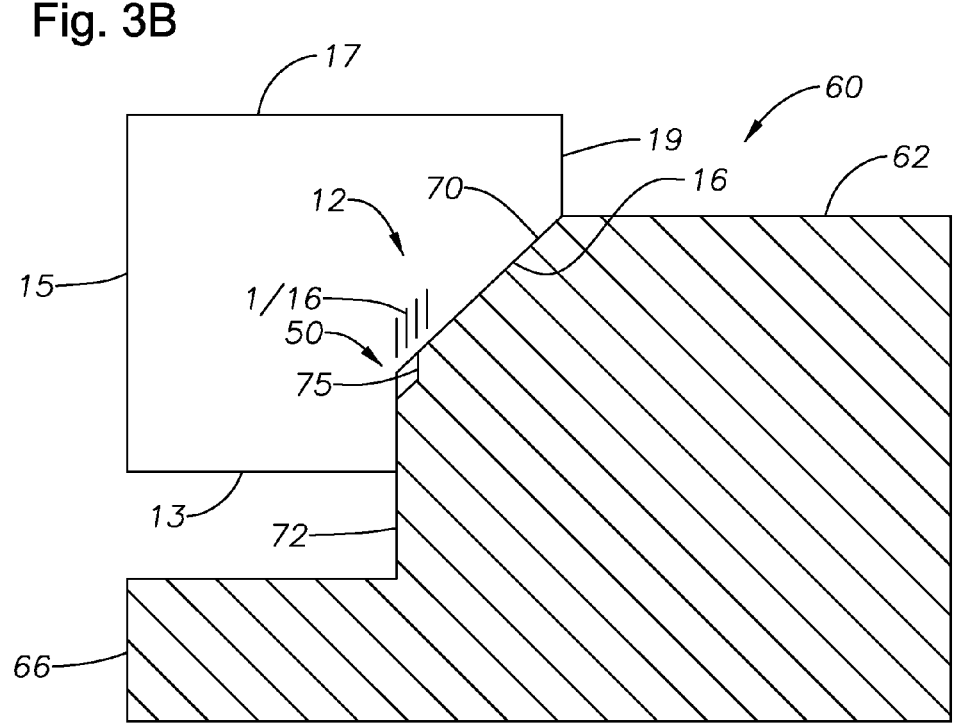

FIGS. 3A-3B depict one illustrative embodiment of a shoulder refacing indicator 10 in accordance with the present invention. The indicator 10 may be made of any material and may be any desired thickness. In one illustrative embodiment, the shoulder refacing indicator 10 may be made of stainless steel and it may have a thickness of approximately 0.125 inches. Preferably, the indicator is of a size and weight such that it may be carried in an inspector's pocket.

In one illustrative embodiment, the shoulder refacing indicator 10 comprises a plurality of graduated scribe lines 12 and surfaces 14 and 16 that define an included angle 18 of 135 degrees. The shoulder refacing indicator 10 includes a plurality of other surfaces 13, 15, 17 and 19. These other surfaces 13, 15, 17, 19 may be of any desired shape or configuration, e.g., rounded, curved, straight, etc.

In the illustrative embodiment depicted in FIGS. 3A-3B, there are four illustrative scribe lines—1/32", 1/16", 3/32" and 1/8". The number of scribe lines 12 may vary depending upon the particular application. Additionally, any measurement units may be employed, e.g., metric or English units. In some cases, the shoulder refacing indicator 10 may be provided with only a single scribe line 12 that indicates whether or not the particular tool joint can be resurfaced, i.e., a go-no go scribe line.

In the embodiment depicted in FIGS. 3A-3B, the vertical surface 75 (see FIG. 1) of the reference mark 50 may be used as a reference point to determine if the pin 60 may be resurfaced. As the surface 72 is refaced, the thickness T of the make-up shoulder 74 (as illustrated in FIG. 1) will decrease. However, using the shoulder refacing indicator 10, the surface 75 of the reference mark 80 may be used to determine the amount of the make-up shoulder 74 remaining. More specifically, as the thickness T of the make-up shoulder 74 decreases, the surface 16 of the shoulder refacing indicator 10 moves up the surface 70 of the pin 60. The scribe line 12 that most closely aligns with the surface 75 of the reference mark 50 indicates the amount of the make-up shoulder 74 remaining for refacing. In the illustrative embodiment depicted in FIG. 3B, the surface 75 is approximately aligned with the "1/16" scribe line, thereby indicating the remaining thickness of the make-up shoulder 74. It should be noted that, if the values of the scribe lines 12 were reversed, the shoulder refacing indicator 10 could be employed to determine the amount of material removed from the make-up shoulder 74.

Figure 4A:
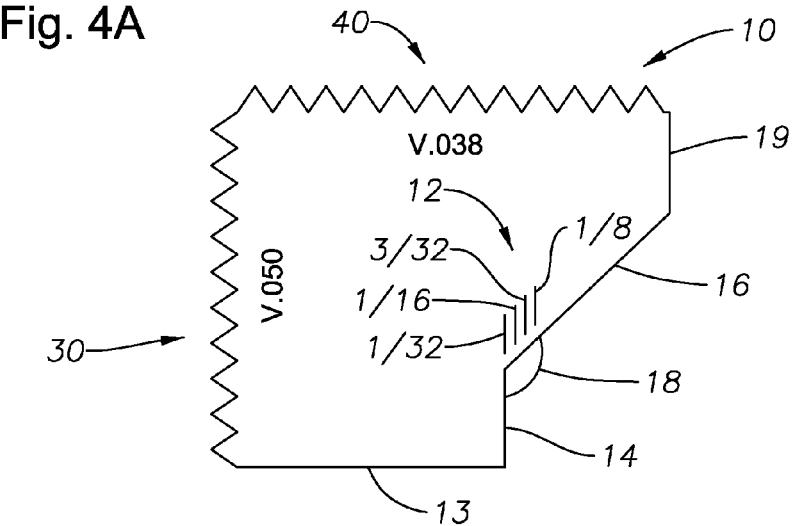
FIGS. 4A-4B depict another illustrative embodiment of the shoulder refacing indicator disclosed herein.
Figure 4B:
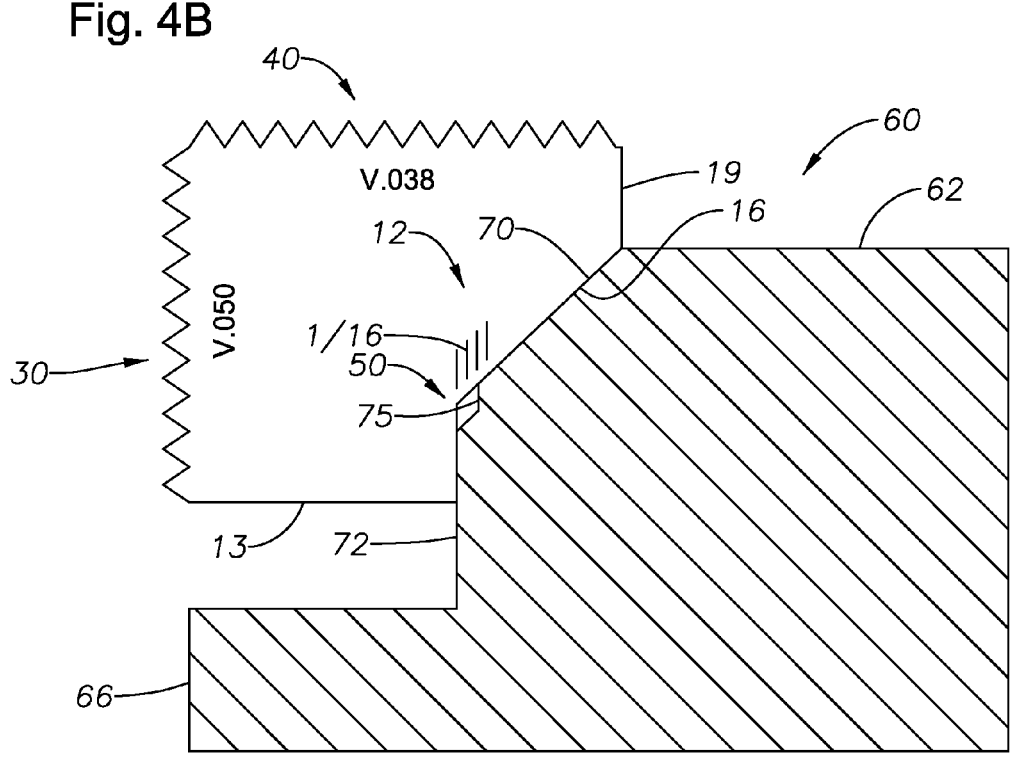

FIGS. 4A-4B depict an alternative embodiment of the shoulder refacing indicator 10 wherein threadform gauges 30, 40 are formed on the surfaces 15, 17, respectively. For example, the threadform gauge 30 may be for a V.050 threadform, and the gauge 40 may be for a V.038 threadform. Of course, other threadform profiles may be formed on the shoulder refacing indicator 10.

Figure 5A:
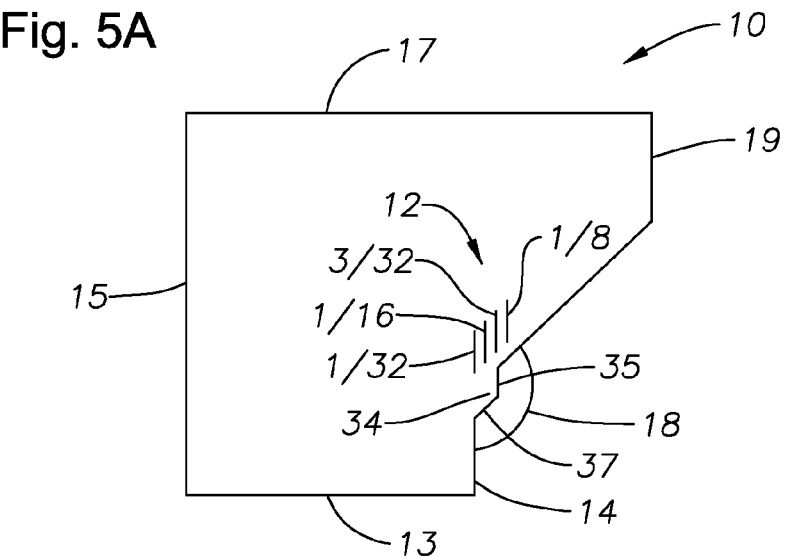
FIGS. 5A-5B depict yet another illustrative embodiment of the shoulder refacing indicator disclosed herein.
Figure 5B:
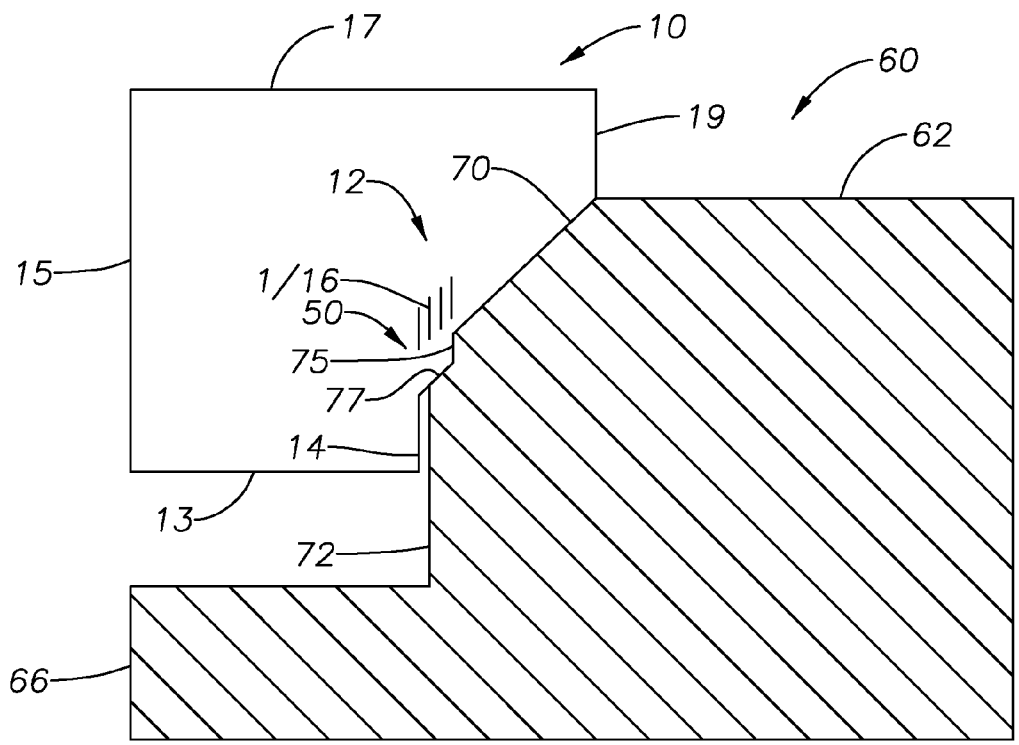

FIGS. 5A-5B depict an alternative embodiment of the present invention. As shown therein, the shoulder refacing indicator 10A comprises a projection 34 that is adapted to mate with various surfaces of the reference mark 50 formed on the connector 60. More specifically, the projection 34 comprises a substantially vertical surface 35 that is adapted to engage the substantially vertical surface 75, and a tapered surface 37 that is adapted to engage at least a portion of a correspondingly tapered surface 77, as shown in FIG. 3B. Due to the engagement between the surfaces 35 and 75, the position of the shoulder refacing indicator 10A is essentially fixed. As the thickness of the make-up shoulder 74 is reduced, the scribe lines 12 that most closely align with the vertical projection of the surface 72 corresponds to the amount of material removed from the make-up plate 74. The scribe line 12 could also be reversed to measure the amount of material remaining.

Figure 6A:
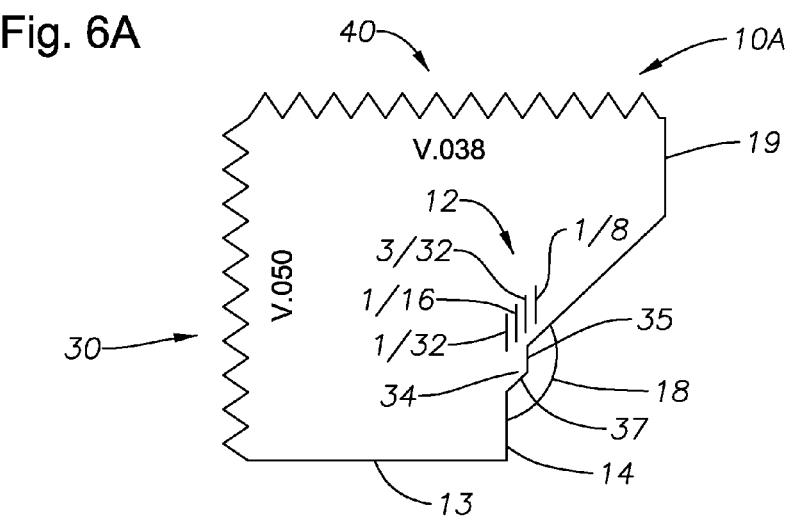
FIGS. 6A-6B depict yet another illustrative embodiment of the shoulder refacing indicator disclosed herein.
Figure 6B:
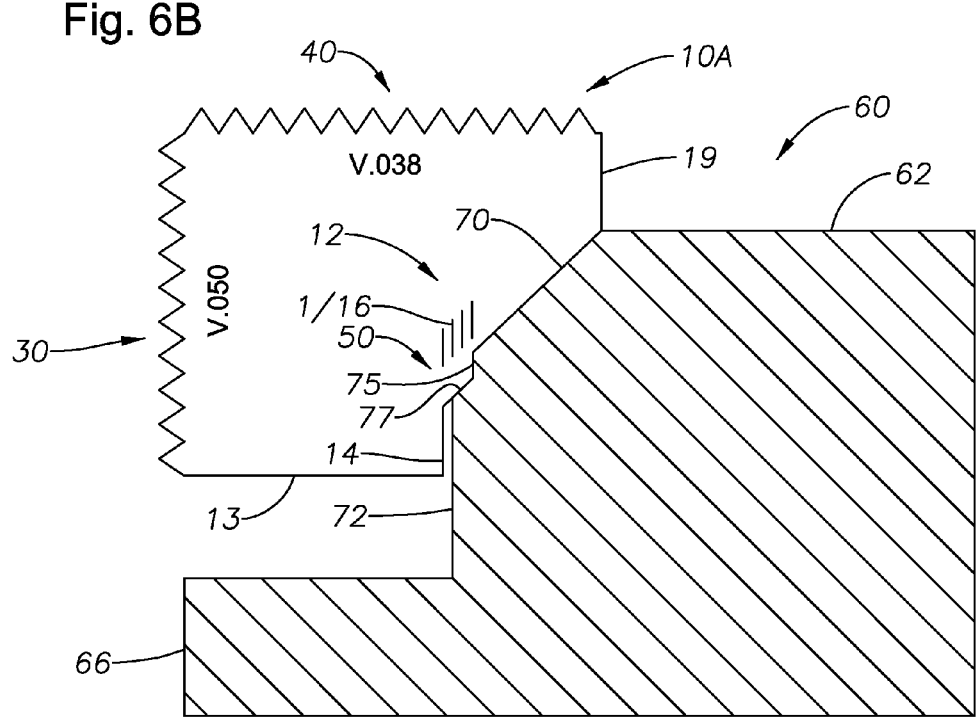

FIGS. 6A-6B depict an alternative embodiment of the shoulder refacing indicator 10A wherein the threadforms 30 and 40 are included, as described above with reference to FIGS. 4A-4B.

Through use of the shoulder refacing indicator disclosed herein, an inspector can determine how much of the shoulder 74 is remaining, if the joint is a candidate for resurfacing, and/or estimate the remaining number of resurfacings available for the joint. Through use of the shoulder refacing indicator 10, 10A, this can be done in a very fast and accurate manner. If the embodiment of the shoulder refacing indicator 10 described in FIGS. 4A-4B and 6A-6B is employed, an inspector may also be able to determine or confirm the type of threads on the tool joint and determine if the threads of the tool joint are in acceptable condition.

The present invention is generally directed to a shoulder refacing indicator, and methods of using same. In one illustrative embodiment, the shoulder refacing indicator includes a body having a first side and a second side, the first and second sides being formed at an included angle of 135 degrees relative to one another, the first side adapted to engage an engaging surface of a make-up shoulder of a pipe connector and the second side adapted to engage a tapered surface of the pipe connector. The shoulder refacing indicator further includes at least one scribe line formed on the body.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A shoulder refacing indicator, comprising: a body comprising: a first side and a second side, said first and second sides being formed at an included angle of 135 degrees relative to one another, said second side adapted to engage a tapered surface of a pipe connector, said pipe connector comprising make-up shoulder having an engaging surface; and a projection located between said first and second sides, said projection comprising a first projection side and a second projection side, wherein said first projection side is adapted to engage a substantially vertical surface of a reference surface formed in said pipe connector and said second projection side is adapted to engage a second tapered surface of said reference surface formed in said pipe connector; and a plurality of scribe lines formed on said body, wherein a position of said engaging surface relative to at least one of said plurality of scribe lines is indicative of whether said engaging surface may be refaced.

2. The shoulder refacing indicator of claim 1, wherein said tapered surface of the pipe connector is on a pin.

3. The shoulder refacing indicator device of claim 1, wherein said tapered surface of the pipe connector is on a box.

4. The shoulder refacing indicator of claim 1, wherein said position of said engaging surface of said make-up shoulder with respect to at least one of said plurality of scribe lines is indicative of the amount of material remaining on said make-up shoulder.

5. The shoulder refacing indicator of claim 1, wherein said position of said engaging surface of said make-up shoulder with respect to at least one of said plurality of scribe lines is indicative of the amount of material removed from said make-up shoulder.

6. The shoulder refacing indicator of claim 1, wherein the position of the engaging surface of the make-up shoulder with respect to the at least one of the plurality of scribe lines is indicative of the amount of material remaining on the make-up shoulder, and wherein said position of the engaging surface of the make-up shoulder with respect to at least one of the plurality of scribe lines is indicative of the amount of material removed from the make-up shoulder.

* * * * *